(No Model.)

E. H. CRANE.
FISH HOOK.

No. 551,582.  Patented Dec. 17, 1895.

Witnesses.
Worth Landon
Belle Cross.

Inventor.
Elliott. H. Crane.

ANDREW B.GRAHAM. PHOTO-LITHO. WASHINGTON. D.C.

UNITED STATES PATENT OFFICE.

ELLIOTT H. CRANE, OF NILES, MICHIGAN.

FISH-HOOK.

SPECIFICATION forming part of Letters Patent No. 551,582, dated December 17, 1895.

Application filed February 16, 1893. Serial No. 462,592. (No model.)

*To all whom it may concern:*

Be it known that I, ELLIOTT H. CRANE, residing at Niles, in the county of Berrien and State of Michigan, have invented an Improved Fish-Hook, of which the following is a specification.

My invention is an improvement in bait fish-hooks; and it consists in the construction and arrangement of a supplemental hook, which constitutes an attachment of a barbed hook of the ordinary type.

Figure 1:
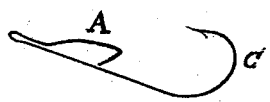
Figure 2:
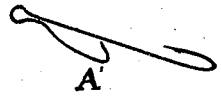
Figure 3:
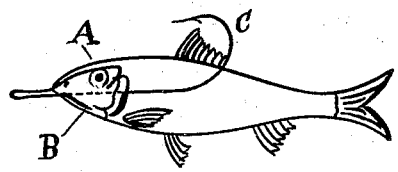

In the accompanying drawings, Figure 1 is a side view of my improved fish-hook. Fig. 2 is a side view of a modified form of such hook. Fig. 3 is a side view illustrating the application of the hook for holding a minnow.

As shown in Fig. 1, my improved fish-hook consists of a short and small elastic bait-holding hook A, arranged alongside the shank of an ordinary barbed hook C. The bait-hook A is constructed integrally with the hook C, being in fact formed from an extension of the spring-shank of the latter—that is to say, such extension is bent or doubled back upon the shank of hook C and the end portion is then bent outward or laterally from the shank and its terminal or point recurved or turned backward. The barbless point of the bait-hook A thus curves in the opposite direction from the point of hook C and lies close to it. The space between the hooks A C is ample to allow a fish to impale itself on the hook C.

To secure a minnow on my improved fish-hook, the barbed hook C is inserted in the mouth and out under the gill-cover B, and then, by pushing gently endwise, the catch or hook A is caused to slide or spring over the said cover and engage its rear edge. Thus the hook C is left free to catch in the mouth of a fish, while the normal action of the gills of the minnow is but slightly obstructed, so that it lives or remains active a comparatively long time.

Fig. 2 shows a bait-hook A', arranged on the outer side of the shank of a barbed hook, instead of on the inner side, as in Fig. 1.

Having thus described my invention, what I claim, and desire to secure by Letters Patent, is—

The improved fish-hook, composed of two hooks, constructed integrally, one being the large impaling hook, and the other a smaller bait-holding hook, which is arranged above such impaling hook and has its curved or bent portion separated from the barbed point of the latter, and its point turned inward toward the shank of the same, as shown and described.

ELLIOTT H. CRANE.

Witnesses:
WORTH LANDON,
BELLE CROSS.